United States Patent
Kato et al.

(10) Patent No.: US 11,929,700 B2
(45) Date of Patent: Mar. 12, 2024

(54) ELECTRIC MOTOR CONTROL DEVICE

(71) Applicant: Mitsubishi Electric Corporation, Tokyo (JP)

(72) Inventors: Toshiaki Kato, Tokyo (JP); Yasushi Otsuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 240 days.

(21) Appl. No.: 17/299,310

(22) PCT Filed: Apr. 11, 2019

(86) PCT No.: PCT/JP2019/015732
§ 371 (c)(1),
(2) Date: Jun. 3, 2021

(87) PCT Pub. No.: WO2020/208766
PCT Pub. Date: Oct. 15, 2020

(65) Prior Publication Data
US 2022/0029563 A1 Jan. 27, 2022

(51) Int. Cl.
*H02P 6/17* (2016.01)
*H02P 6/08* (2016.01)
(Continued)

(52) U.S. Cl.
CPC ............ *H02P 6/16* (2013.01); *H02P 6/08* (2013.01); *H02P 6/15* (2016.02); *H02P 6/34* (2016.02); *H02P 21/18* (2016.02)

(58) Field of Classification Search
CPC .... H02P 6/34; H02P 6/08; H02P 21/18; H02P 6/15; H02P 6/16; H02P 6/17; G01P 3/481; G01P 21/02; G01D 3/032
(Continued)

(56) References Cited

U.S. PATENT DOCUMENTS

| 10,895,866 B1* | 1/2021 | Bae | H02K 29/06 |
| 2012/0112672 A1* | 5/2012 | Niimi | H02P 6/18 |
| | | | 318/400.04 |

(Continued)

FOREIGN PATENT DOCUMENTS

| CN | 104836487 A | 8/2015 |
| JP | 63-179259 A | 7/1988 |

(Continued)

OTHER PUBLICATIONS

International Search Report and Written Opinion dated Jul. 16, 2019, received for PCT Application PCT/JP2019/015732, Filed on Apr. 11, 2019, 9 pages including English Translation.

(Continued)

*Primary Examiner* — Kawing Chan
*Assistant Examiner* — Gabriel Agared
(74) *Attorney, Agent, or Firm* — XSENSUS LLP

(57) ABSTRACT

An electric motor control device that can accurately calculate the rotating speed of an electric motor. The electric motor control device includes a speed calculating unit configured to receive, from a position detector that detects a rotational position of an electric motor and outputs a position detection signal including a periodic error determined according to the rotational position, an input of the position detection signal, receive, from a time detector that outputs a position change time signal obtained by detecting a time period in which the position detection signal output from the position detector changes, an input of the position change time signal, and calculate rotating speed of the electric motor based on the position detection signal and the position change time signal. Further, there is a speed correcting unit for correcting a periodic speed error determined according to the rotational position of the electric motor.

20 Claims, 10 Drawing Sheets

(51) Int. Cl.
*H02P 6/15* (2016.01)
*H02P 6/16* (2016.01)
*H02P 6/34* (2016.01)
*H02P 21/18* (2016.01)

(58) Field of Classification Search
USPC .................................................. 318/400.13
See application file for complete search history.

(56) References Cited

U.S. PATENT DOCUMENTS

| | | | |
|---|---|---|---|
| 2014/0001999 A1* | 1/2014 | Sato | H02P 6/06 |
| | | | 318/503 |
| 2014/0035493 A1* | 2/2014 | Ajima | H02P 6/16 |
| | | | 318/400.04 |
| 2014/0346983 A1* | 11/2014 | Kato | H02P 21/16 |
| | | | 318/400.02 |
| 2015/0220067 A1 | 8/2015 | Tsuneki | |

FOREIGN PATENT DOCUMENTS

| | | |
|---|---|---|
| JP | 5-15184 A | 1/1993 |
| JP | 2012-145371 A | 8/2012 |

OTHER PUBLICATIONS

Japanese Notification of Reasons for Refusal dated Nov. 1, 2022 in corresponding Japanese Patent Application No. 2021-513106 (with machine-generated English translation), 4 pages.

Chinese Office Action dated May 10, 2023 in corresponding Chinese Patent Application No. 201980092724.4 (with 1 machine-generated English translation), 16 pages.

* cited by examiner the present invention, the calculation of the rotating speed of the electric motor is corrected by the speed correction value calculated by the speed correction model. Accordingly, it is possible to accurately calculate the rotating speed of the electric motor.

ELECTRIC MOTOR CONTROL DEVICE

CROSS-REFERENCE TO RELATED APPLICATION

The present application is based on PCT filing PCT/JP2019/015732, filed Apr. 11, 2019, the entire contents of which are incorporated herein by reference.

FIELD

The present invention relates to an electric motor control device.

BACKGROUND

PTL 1 discloses an electric motor control device. The control device detects pulses corresponding to rotational positions in an encoder attached to an electric motor and measures a pulse interval of the encoder with a timer. The control device divides an amount of change of the pulses at every preset calculation period by an amount of change of the timer to calculate rotating speed of the electric motor.

CITATION LIST

Patent Literature

[PTL 1] JP H5-15184 A

SUMMARY

Technical Problem

However, in the control device described in PTL 1, a periodic error is included in detection values of the rotational positions of the electric motor. Accordingly, an error is also included in calculation values of the rotating speed of the electric motor.

The present invention has been made in order to solve the problem described above. An object of the present invention is to provide an electric motor control device that can accurately calculate rotating speed of an electric motor.

Solution to Problem

An electric motor control device according to the present invention includes: a speed calculating unit configured to receive, from a position detector that detects a rotational position of an electric motor and outputs a position detection signal including a periodic error determined according to the rotational position, an input of the position detection signal, receive, from a time detector that outputs a position change time signal obtained by detecting a time period in which the position detection signal output from the position detector changes, an input of the position change time signal, and calculate rotating speed of the electric motor based on the position detection signal and the position change time signal and output the rotating speed; and a speed correcting unit configured to receive an input of the position detection signal output from the position detector and correct the rotating speed output by the speed calculating unit with a speed correction value calculated by a speed correction model for correcting a periodic speed error determined according to the rotational position included in the rotating speed of the electric motor based on the position detection signal.

Advantageous Effects of Invention

According to the present invention, the calculation of the rotating speed of the electric motor is corrected by the speed correction value calculated by the speed correction model. Accordingly, it is possible to accurately calculate the rotating speed of the electric motor.

DESCRIPTION OF EMBODIMENTS

Figure 1:
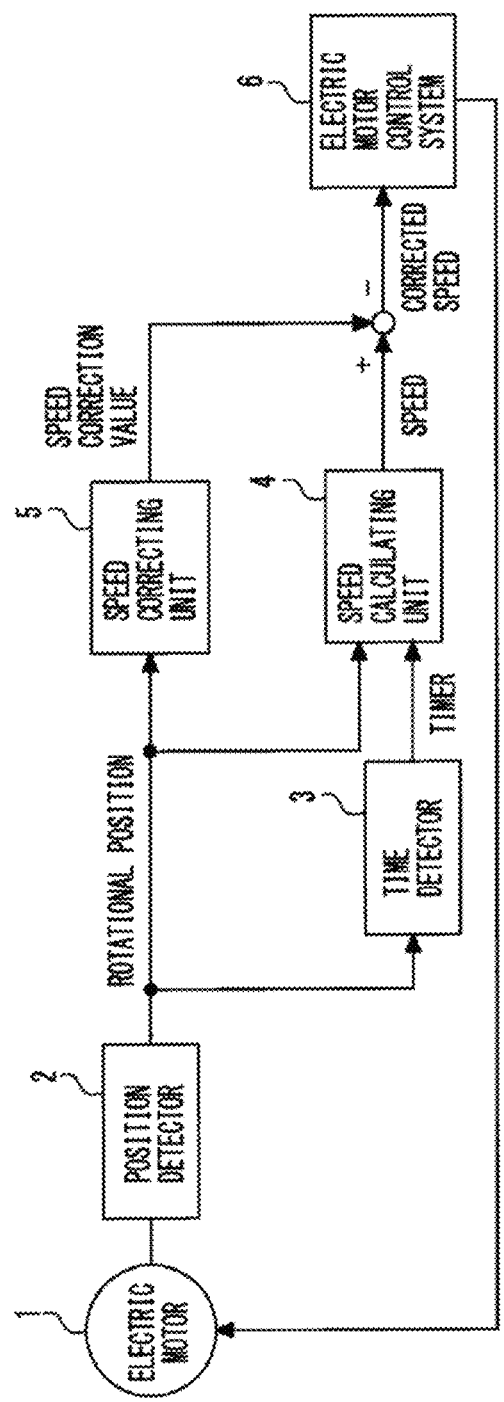
FIG. 1 is a block diagram of an electric motor system applied with an electric motor control device according to a first embodiment.

Modes for carrying out the present invention are explained with reference to the accompanying drawings. Note that, in the figures, the same or equivalent portions are denoted by the same reference numerals and signs. Repetitive descriptions of the portions are simplified or omitted as appropriate.

First Embodiment

FIG. 1 is a block diagram of an electric motor system applied with an electric motor control device in a first embodiment.

As shown in FIG. 1, the electric motor system includes an electric motor 1, a position detector 2, a time detector 3, a speed calculating unit 4, a speed correcting unit 5, and an electric motor control system 6.

A type of the electric motor 1 is not limited. For example, the electric motor 1 is a permanent magnet synchronous machine. For example, the electric motor 1 is an induction motor.

For example, the position detector 2 is an optical encoder. For example, the position detector 2 is a resolver. For example, the position detector 2 is a magnetic sensor. The position detector 2 detects a rotational position of the electric motor 1 and outputs information concerning the rotational position as a position detection signal. At this time, the position detector 2 outputs information concerning a rotational position θ including a periodic error represented by the following Expression (1) with respect to a true rotational position $θ_m$.

[Math. 1]

$$θ=θ_m+A \sin(Xθ_m+φ) \quad (1)$$

In Expression (1), A is amplitude of the periodic error, X is a degree of the periodic error, and φ is a phase of the periodic error.

Note that, in Expression (1), only a periodic error of one degree is shown. However, a model including a plurality of periodic errors may be conceived.

For example, the periodic error occurs based on a failure of a slit in the encoder. For example, the periodic error occurs based on magnetic distortion in the resolver or the magnetic sensor or an external magnetic field.

Note that A, X, and φ are known. For example, a periodic error included in the position detector 2 is identified using a reference encoder or the like by a shipping test. For example, A, X, and φ are automatically identified during the operation of the electric motor 1.

The time detector 3 measures a time interval of rotational positions of the electric motor 1 obtained by the position detector 2. For example, the time detector 3 performs processing for detecting a rising edge at the time when a rotational position of the electric motor 1 changes, starting a timer, and measuring a time period until the next rising edge. The time detector 3 outputs a measurement value at this time as a position change time signal.

The speed calculating unit 4 calculates rotating speed of the electric motor 1 based on a difference between a detection value of the rotational position detected by the position detector 2 and the measurement value of the timer of the time detector 3. Specifically, the speed calculating unit 4 calculates rotating speed $ω_m(k)$ of the electric motor 1 using the following Expression (2).

[Math. 2]

$$ω_m(k) = \frac{θ(k) - θ(k-1)}{T(k) - T(k-1)} \quad (2)$$

In Expression (2), k is the latest time of a speed calculation period, k−1 is time in the immediately preceding step, θ(k) is a rotational position of the electric motor 1 at the time k, θ(k−1) is a rotational position of the electric motor 1 at the time k−1, T(k) is a measurement value of the timer at the time k, and T(k−1) is a measurement value of the timer at the time k−1.

As shown in Expression (1), a periodic error is included in the detection value of the rotational position detected by the position detector 2. Accordingly, actually calculated rotating speed of the electric motor 1 is rotating speed including an error. Specifically, the rotating speed of the electric motor 1 is represented by Expression (3).

[Math. 3]

$$ω(k) = \frac{(θ(k) + Δθ(k)) - (θ(k-1) + Δθ(k-1))}{(T(k)\,ΔT(k)) - (T(k-1) + ΔT(k-1))} \quad (3)$$

In Expression (3), Δθ(k) is an error of a rotational position of the electric motor 1 at the time k, ΔT(k) is an error of a measurement value of the timer at the time k, Δθ(k−1) is an error of a rotational position of the electric motor 1 at the time k−1, and ΔT(k−1) is an error of a measurement value of the timer at the time k−1.

For example, even if the periodic error included in the position detector 2 is corrected in the numerator of Expression (3) and the rotating speed of the electric motor 1 is calculated in a state without an error of the rotational position of the electric motor 1, the error included in the measurement value of the timer remains. Accordingly, an error occurs in a calculation value of the rotating speed of the electric motor 1. Expression (3) is converted into the following Expression (4).

[Math. 4]

$$ω(k)=ω_m(k)+Δω(k) \quad (4)$$

As shown in Expression (4), the speed calculating unit 4 calculates rotating speed ω obtained by adding an error Δω to true rotating speed $ω_m$.

A relation between ω of Expression (4) and the model of Expression (1) is considered. When Expression (1) is time-differentiated, the following Expression (5) is obtained.

[Math. 5]

$$ω=ω_m+AXω_m \cos(Xθ_m+φ) \quad (5)$$

The following Expression (6) holds according to comparison of Expression (4) and Expression (5).

[Math. 6]

$$Δω=AXω_m \cos(Xθ_m+φ) \quad (6)$$

Expression (6) shows a speed error included in the rotating speed of the electric motor 1 calculated according to the detection value of the rotational position of the electric motor 1 by the position detector 2 and the measurement value of the timer by the time detector 3.

The speed correcting unit 5 calculates a speed correction value for correcting the rotating speed of the electric motor 1 calculated by the speed calculating unit 4 according to Expression (6). The speed correcting unit 5 subtracts the speed correction value from a value of the rotating speed of the electric motor 1 calculated by the speed calculating unit 4 to correct the rotating speed of the electric motor 1.

The electric motor control system 6 controls the electric motor 1 based on the corrected rotating speed without an error.

Next, the operation of the time detector 3 is explained with reference to FIG. 2.

Figure 2:
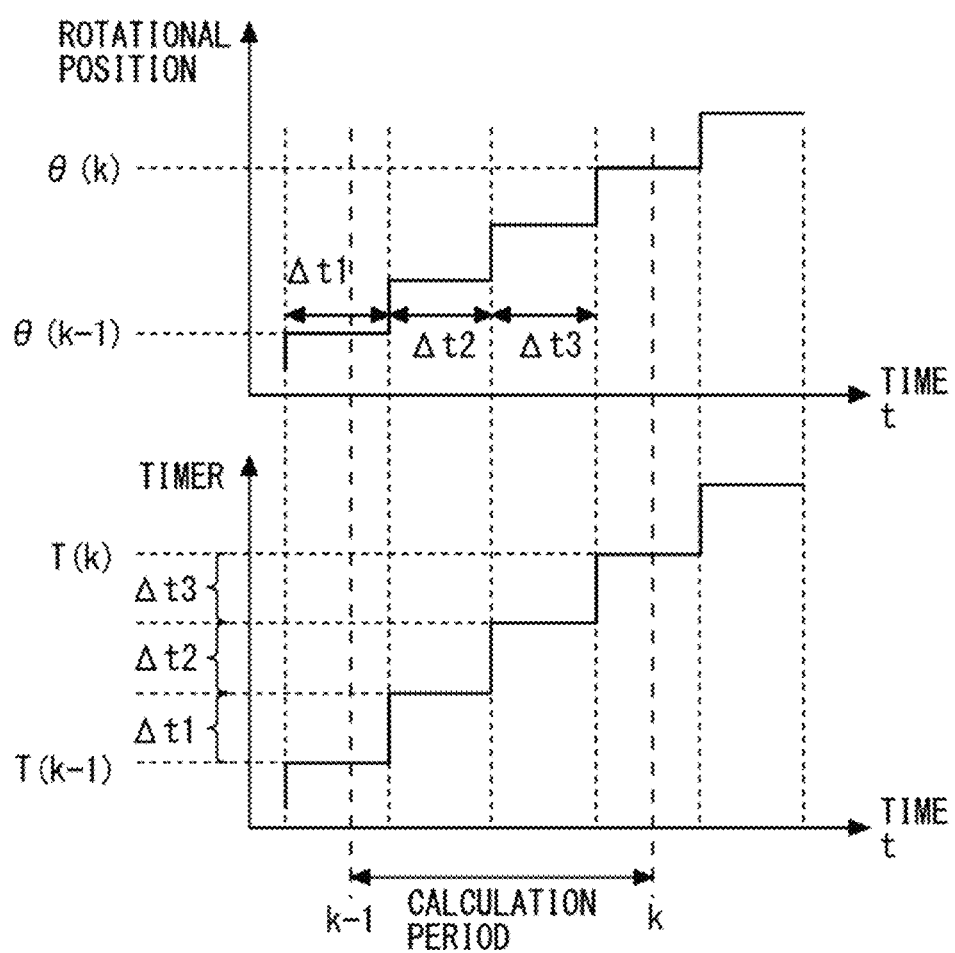
FIG. 2 is a diagram for explaining the operation of a time detector of the electric motor system applied with the electric motor control device in the first embodiment.

FIG. 2 is a diagram for explaining the operation of the time detector of the electric motor system applied with the electric motor control device in the first embodiment.

As shown in FIG. 2, the time detector 3 starts to measure a time period when the rotational position of the electric motor 1 changes. Specifically, the time detector 3 measures time periods such as Δt1, Δt2, and Δt3. At this time, the timer accumulates changed time periods Δt1, Δt2, and Δt3. The timer operates at a clock faster than a period of calculating the rotating speed of the electric motor 1. Accordingly, time resolution is finer. As a result, accuracy of the calculation of the rotating speed of the electric motor 1 is improved. In particular, the calculation accuracy of the rotating speed of the electric motor 1 is improved in a region where the rotating speed of the electric motor 1 is low and a change in the rotational position of the electric motor 1 is small.

Note that the time interval of the rotational positions of the electric motor 1 may be measured by other methods. The time interval of the rotational positions of the electric motor 1 may be measured by software or may be measured by hardware.

Next, a delay of the speed calculating unit 4 is explained with reference to FIG. 3.

Figure 3:
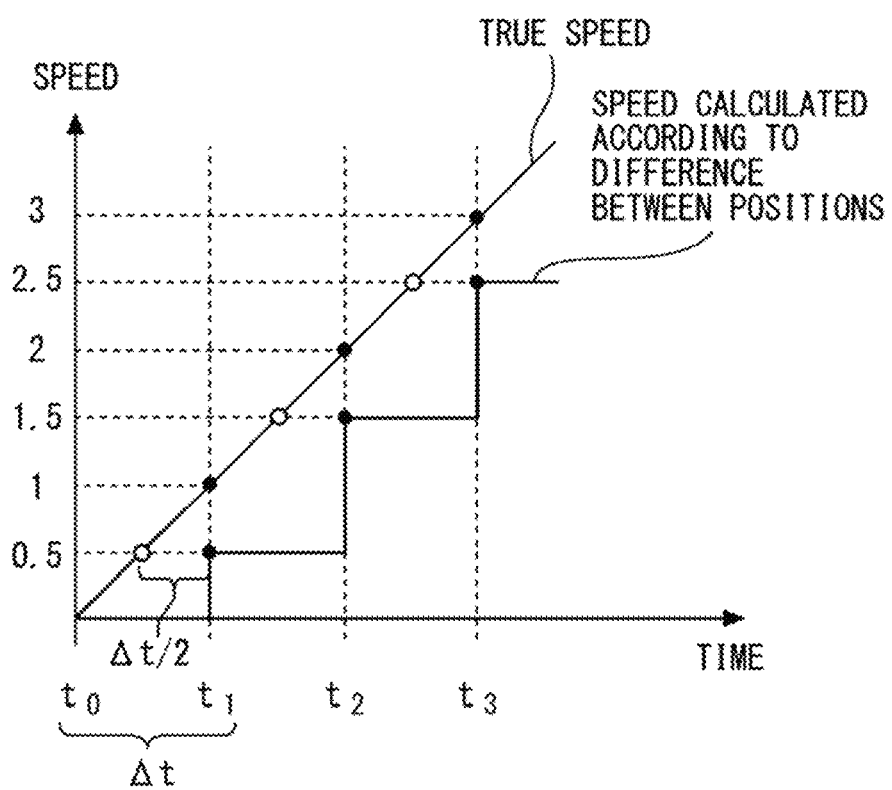
FIG. 3 is a diagram for explaining a delay of a speed calculating unit of the electric motor control device in the first embodiment.

FIG. 3 is a diagram for explaining a delay of the speed calculating unit of the electric motor control device in the first embodiment.

As shown in FIG. 3, the speed calculating unit 4 divides a difference between the detection values of the rotational positions of the electric motor 1 by a difference between the measurement values of the timer as to calculate rotating speed of the electric motor 1 shown in Expression (2) and Expression (3). The rotating speed of the electric motor 1 at this time is average speed in a calculation period. For example, at time t1, the speed calculating unit 4 calculates 0.5, which is an average of true speed 0 at time t0 and true speed 1 at the time t1, as the rotating speed of the electric motor 1. For example, at time t2, the speed calculating unit 4 calculates average speed 1.5 between the time t1 and the time t2 as the rotating speed of the electric motor 1. For example, at time t3, the speed calculating unit 4 calculates average speed 2.5 between the time t2 and the time t3 as the rotating speed of the electric motor 1.

That is, the speed calculating unit 4 calculates rotating speed delayed by a half time of the calculation period with respect to true rotating speed. Therefore, the speed correcting unit 5 carries out correction considering an occurring delay by calculating the rotating speed of the electric motor 1 based on the difference between the detection values of the rotational positions of the electric motor 1 and the difference between the measurement values of the timer. A speed correction model at this time is Expression (7) considering the time delay of the speed calculating unit 4 with respect to Expression (6).

[Math. 7]

$$\Delta\omega = AX\omega_m \cos(X\theta_m + \phi - X\omega_m \Delta t/2) \quad (7)$$

In Expression (7), $\Delta t$ is a calculation period for the rotating speed of the electric motor 1. The speed correcting unit 5 corrects, according to the speed correction model of Expression (7), the periodic error included in the rotating speed calculated by the speed calculating unit 4 and calculates rotating speed without an error.

Next, the speed correcting unit 5 is explained with reference to FIG. 4.

Figure 4:
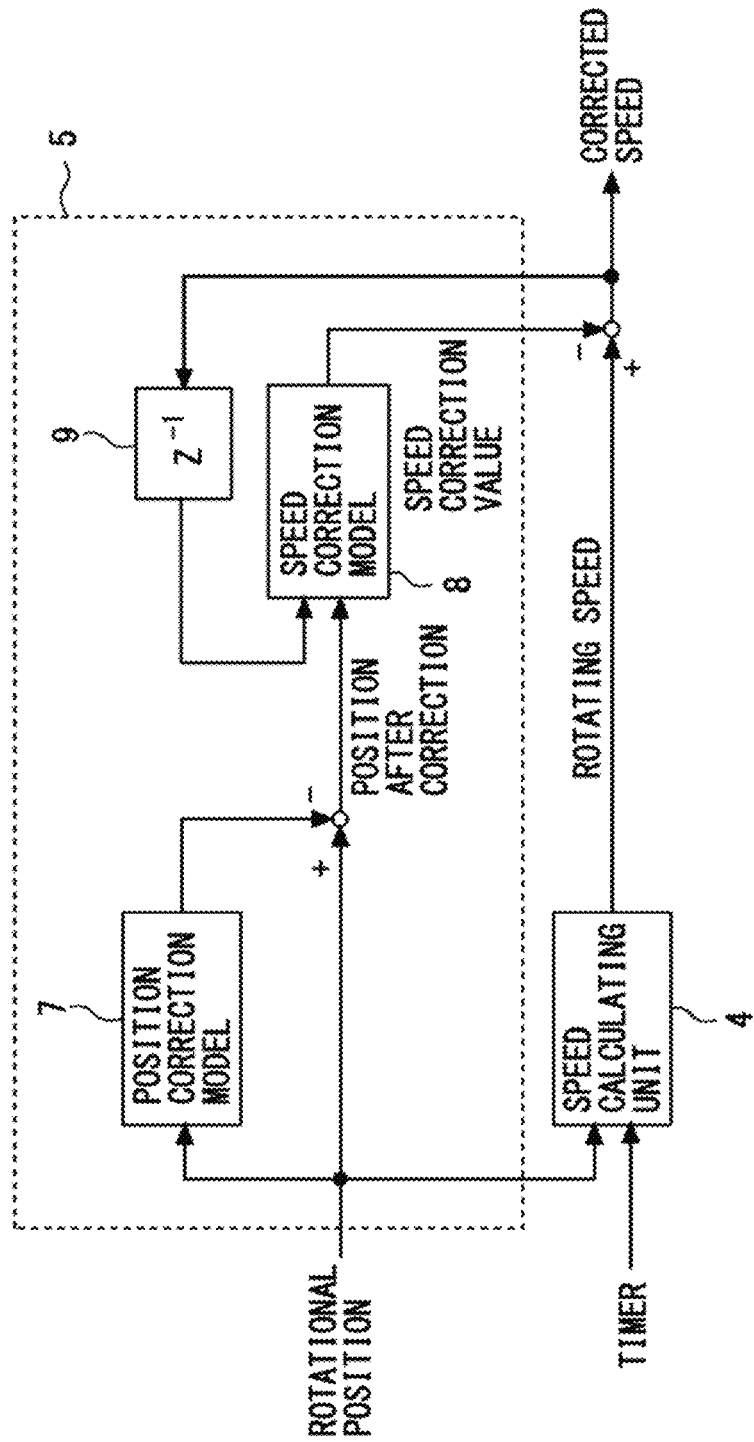
FIG. 4 is a diagram for explaining a speed correcting unit of the electric motor control device in the first embodiment.

FIG. 4 is a diagram for explaining the speed correcting unit of the electric motor control device in the first embodiment.

As shown in FIG. 4, the speed correcting unit 5 includes a position correction model 7, a speed correction model 8, and a delay device 9.

Since a true rotational position of the electric motor 1 is not obtained, the position correction model 7 corrects the detection value of the rotational position detected by the position detector 2. Specifically, the position correction model 7 corrects the periodic error shown in Expression (1). At this time, the corrected rotational position is small enough not to affect the accuracy of the correction of the rotating speed of the electric motor 1.

The speed correction model 8 receives an input of the rotational position corrected by the position correction model 7 and calculates the speed correction value of Expression (7).

In Expression (7), the amplitude A of the error, the degree X of the error, the phase $\phi$ of the error, the position after correction $\theta_m$, and the speed calculation period $\Delta t$ are known. In contrast, the true rotating speed $\omega_m$ is unknown. Accordingly, the speed correction model 8 obtains, from the delay device 9, corrected speed of the electric motor 1 in the immediately preceding step of the speed calculation period and calculates the speed correction value. The speed correction value corrects the rotating speed calculated by the speed calculating unit 4. As a result, corrected speed of the electric motor 1 is obtained.

Next, a first example of an effect of correction is explained with reference to FIG. 5.

Figure 5:
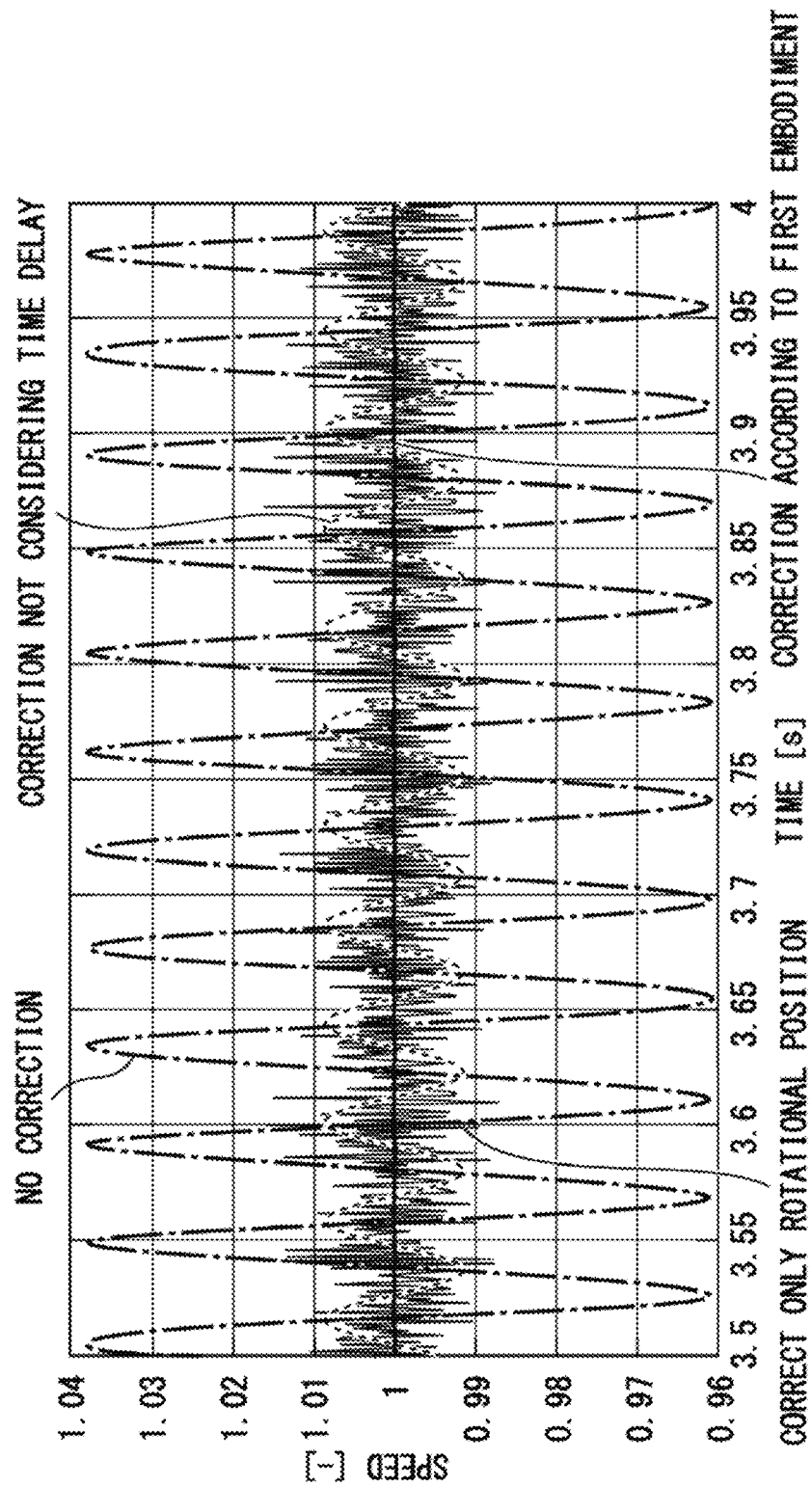
FIG. 5 is a diagram for explaining a first example of an effect of correction by the electric motor control device in the first embodiment.

FIG. 5 is a diagram for explaining a first example of an effect of correction by the electric motor control device in the first embodiment.

FIG. 5 shows a correction result in the case in which the electric motor 1 is rotating at constant speed. When only the rotational position of the electric motor 1 is corrected as in the related art, a speed error occurs according to an error of a measurement value of the timer. In contrast, a speed error does not occur in the correction by Expression (7) in the first embodiment.

Next, a second example of the effect of the correction is explained with reference to FIG. 6.

Figure 6:
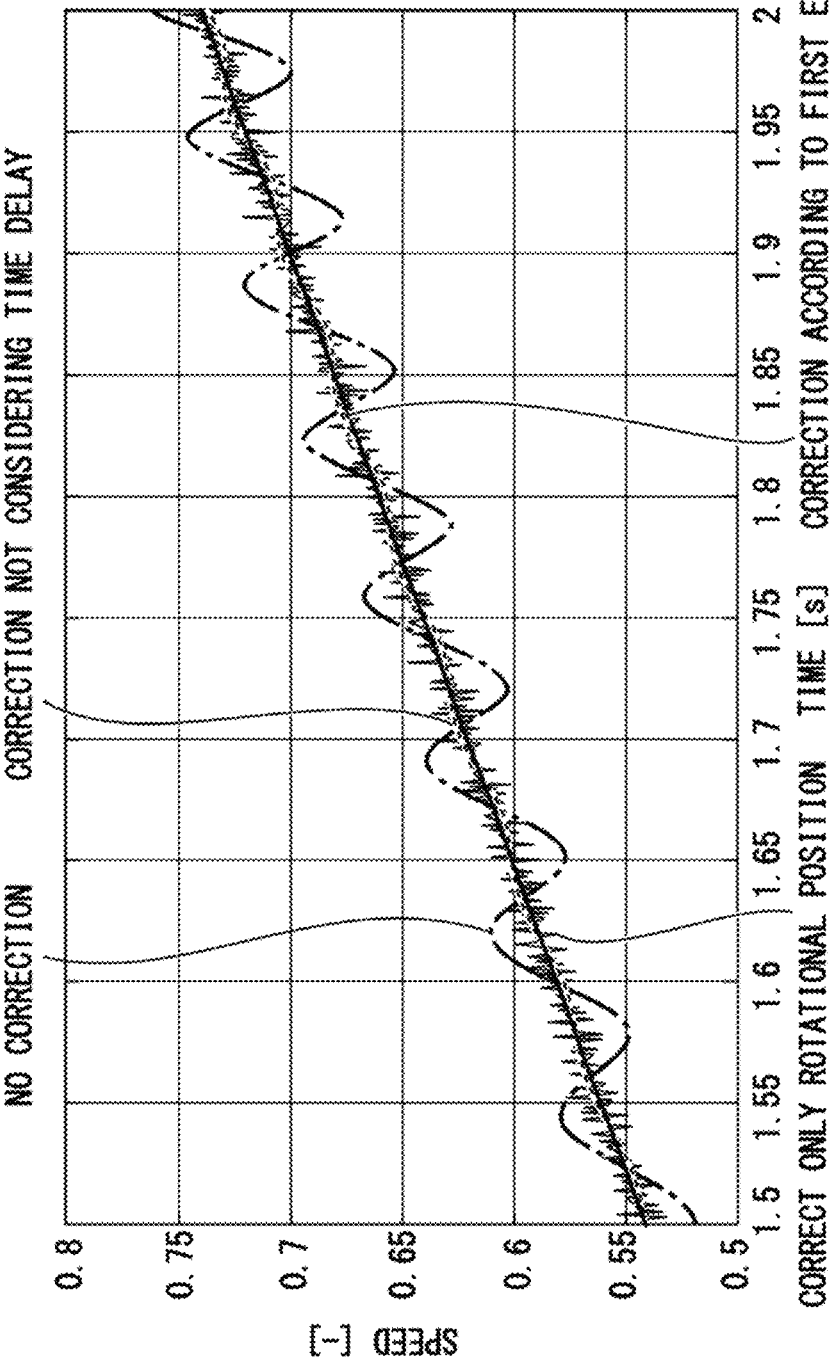
FIG. 6 is a diagram for explaining a second example of the effect of the correction by the electric motor control device in the first embodiment.

FIG. 6 is a diagram for explaining a second example of the effect of the correction by the electric motor control device in the first embodiment.

FIG. 6 shows a correction result in the case in which the electric motor 1 is accelerating. In FIG. 6, as in FIG. 5, a speed error does not occur in the correction by Expression (7) in the first embodiment.

According to the first embodiment explained above, when the periodic error is included in the detection value of the position detector 2, correction is performed in the dimension of the rotating speed of the electric motor 1 when the rotating speed of the electric motor 1 is calculated based on the detection value of the rotational position of the electric motor 1 and the measurement value of the timer. Therefore, both of the error of the rotational position of the electric motor 1 and the error of the timer are corrected. Accordingly, it is possible to accurately calculate the rotating speed of the electric motor 1. As a result, it is possible to prevent deterioration in control performance of the electric motor 1.

The speed correcting unit 5 performs calculation using the corrected speed of the electric motor 1 in the immediately preceding step when the speed correction value is calculated in the speed correction model 8. Accordingly, it is possible to calculate the rotating speed of the electric motor 1 only with detection values of sensors without using information about control of the electric motor 1.

Next, an example of the speed calculating unit 4 and the speed correcting unit 5 is explained with reference to FIG. 7.

Figure 7:
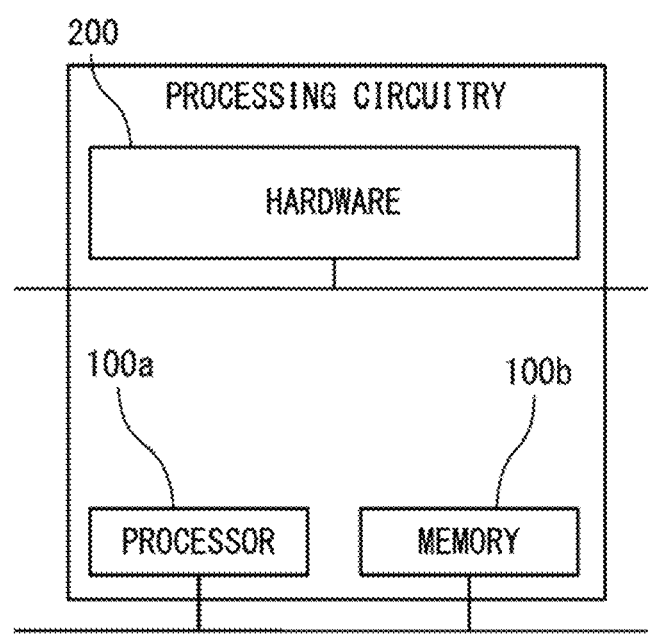
FIG. 7 is a hardware configuration diagram of the speed calculating unit and the speed correcting unit functioning as the electric motor control device in the first embodiment.

FIG. 7 is a hardware configuration diagram of the speed calculating unit and the speed correcting unit functioning as the electric motor control device in the first embodiment.

The speed calculating unit 4 and the speed correcting unit 5 function as a part of the control device for the electric motor 1. Functions of the control device can be realized by processing circuitry. For example, the processing circuitry includes at least one processor 100a and at least one memory 100b. For example, the processing circuitry includes at least one dedicated hardware 200.

When the processing circuitry includes the at least one processor 100a and the at least one memory 100b, the functions of the control device are realized by software, firmware, or a combination of the software and the firmware. At least one of the software or the firmware is described as a program. At least one of the software or the firmware is stored in the at least one memory 100b. The at least one processor 100a reads out and executes a program stored in the at least one memory 100b to thereby realize the functions of the control device. The at least one processor 100*a* is called central processing unit, processing unit, arithmetic unit, microprocessor, microcomputer, or DSP as well. For example, the at least one memory 100*b* is a nonvolatile or volatile semiconductor memory such as a RAM, a ROM, a flash memory, an EPROM, or an EEPROM, a magnetic disk, a flexible disk, an optical disk, a compact disk, a minidisk, a DVD, or the like.

When the processing circuitry includes the at least one dedicated hardware 200, the processing circuitry is realized by, for example, a single circuit, a composite circuit, a programmed processor, a parallel-programmed processor, an ASIC, an FPGA, or a combination of the single circuit, the composite circuit, the programmed processor, the parallel-programmed processor, the ASIC, and the FPGA. For example, the functions of the control device are respectively realized by processing circuitry. For example, the functions of the control device are collectively realized by the processing circuitry.

A part of the functions of the control device may be realized by the dedicated hardware 200. The other part of the functions of the control device may be realized by software or firmware. For example, the functions of the speed calculating unit 4 may be realized by the processing circuitry functioning as the dedicated hardware 200. The functions other than the function of the speed calculating unit 4 may be realized by the at least one processor 100*a* reading out and executing a program stored in the at least one memory 100*b*.

In this way, the processing circuitry realizes the functions of the control device with the hardware 200, the software, the firmware, or a combination of the hardware 200, the software, and the firmware.

Second Embodiment

Figure 8:
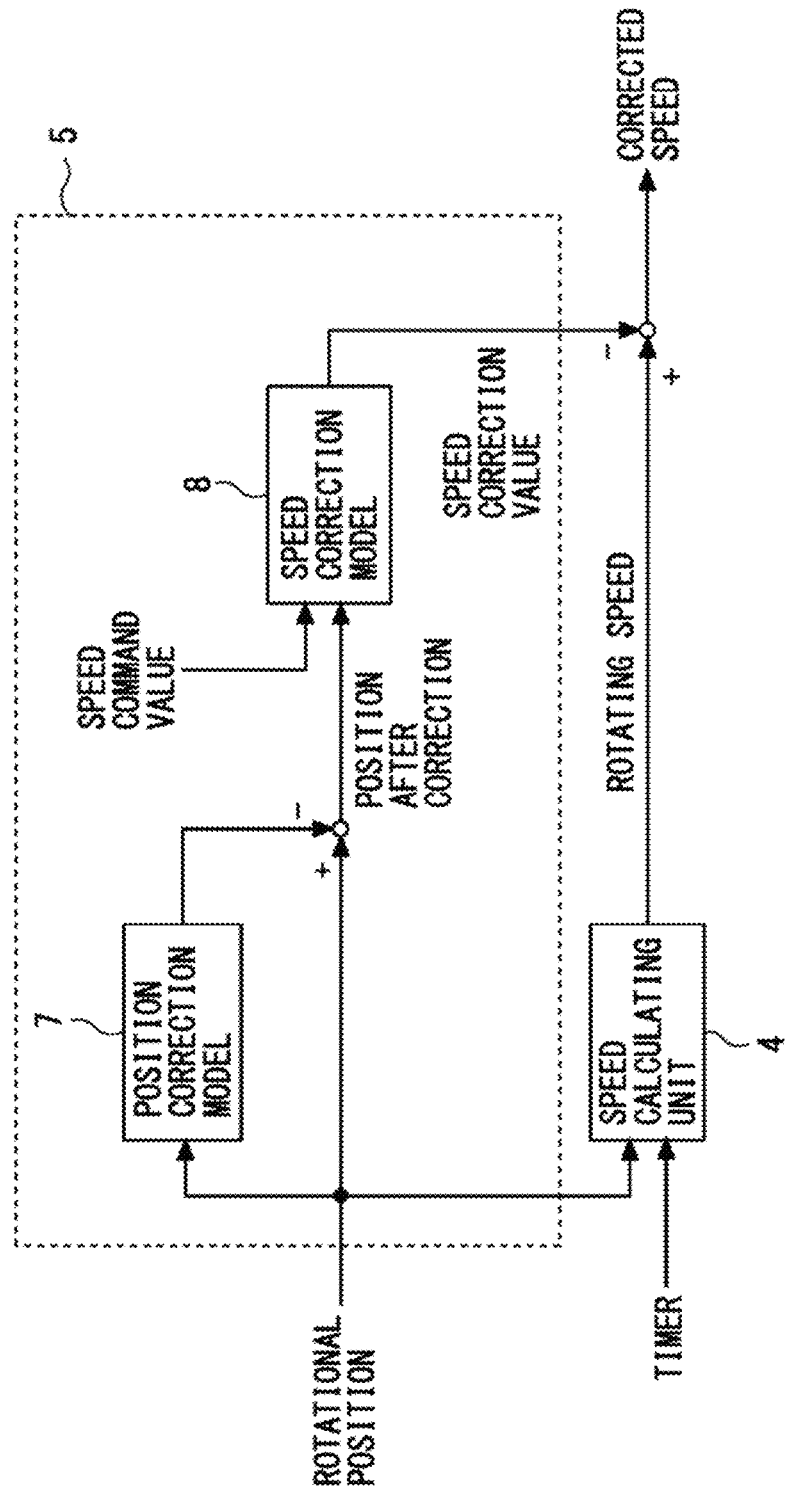
FIG. 8 is a diagram for explaining a speed correcting unit of an electric motor control device in a second embodiment.

FIG. 8 is a diagram for explaining a speed correcting unit of an electric motor control device in a second embodiment. Note that portions same as or equivalent to the portions in the first embodiment are denoted by the same reference numerals and signs. Explanation about the portions is omitted.

In the second embodiment, when the electric motor 1 is operating based on a speed command value, the speed correction model 8 calculates a speed correction value based on the speed command value. Specifically, the speed command value is represented as $\omega_r$ and the speed correction model 8 calculates a speed correction value $\Delta\omega$ using the following Expression (8).

[Math. 8]

$$\Delta\omega = AX\omega_r \cos(X_m + \phi - X\omega_r \Delta t/2) \quad (8)$$

At this time, speed control by the electric motor control system 6 is performed. When the speed command value $\omega_r$ and the actual speed $\omega_m$ coincide, the speed correction value $\Delta\omega$ is calculated by Expression (8). The rotating speed of the electric motor 1 is corrected by the speed correction value $\Delta\omega$. As a result, corrected speed of the electric motor 1 is obtained. The corrected speed does not include an error. Accordingly, the electric motor 1 is operated without deteriorating the control performance of the electric motor 1.

Next, a first example of an effect of correction is explained with reference to FIG. 9.

Figure 9:
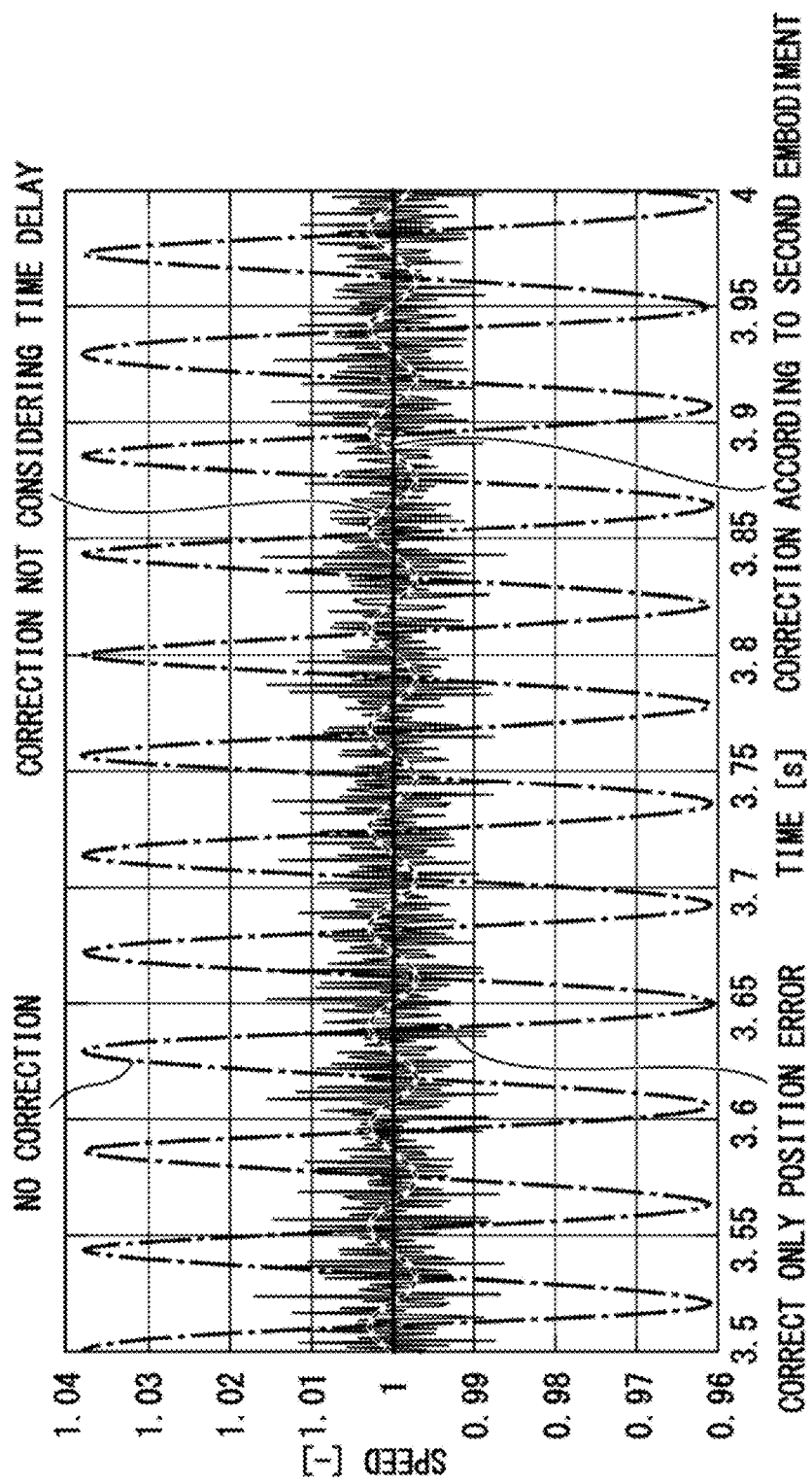
FIG. 9 is a diagram for explaining a first example of an effect of correction by the electric motor control device in the second embodiment.

FIG. 9 is a diagram for explaining a first example of an effect of correction by the electric motor control device in the second embodiment.

FIG. 9 shows a correction result in the case in which the electric motor 1 is rotating at constant speed. When only the rotational position of the electric motor 1 is corrected as in the related art, a speed error occurs according to an error of a measurement value of the timer. In contrast, a speed error does not occur in the correction by Expression (8) in the second embodiment.

Next, a second example of the effect of the correction is explained with reference to FIG. 10.

Figure 10:
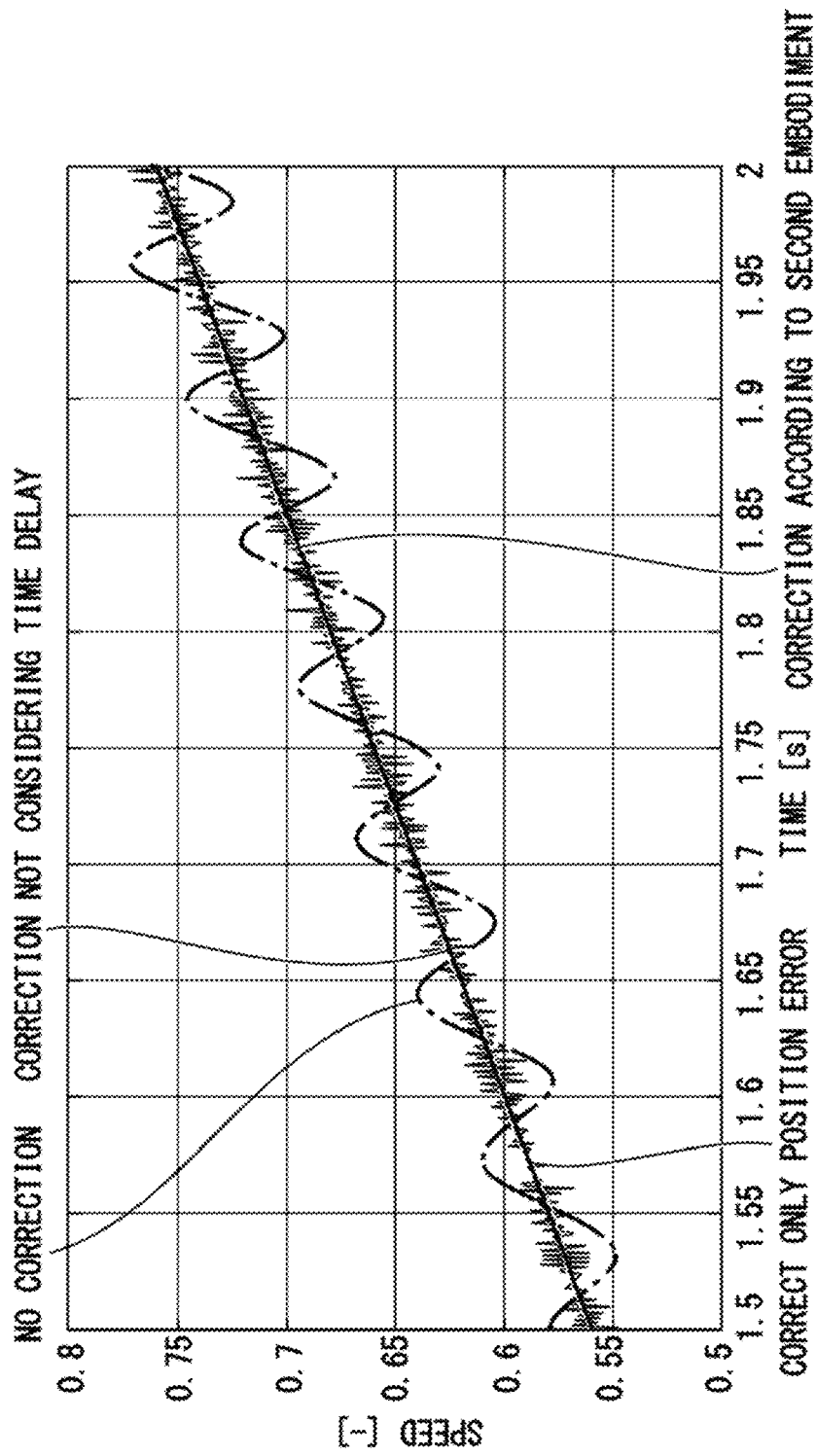
FIG. 10 is a diagram for explaining a second example of the effect of the correction by the electric motor control device in the second embodiment.

FIG. 10 is a diagram for explaining a second example of the effect of the correction by the electric motor control device in the second embodiment.

FIG. 10 shows a correction result in the case in which the electric motor 1 is accelerating. In FIG. 10, as in FIG. 9, a speed error does not occur in the correction by Expression (8) in the second embodiment.

According to the second embodiment explained above, when a periodic error is included in a detection value of the position detector 2, correction is performed in the dimension of the rotating speed of the electric motor 1 when the rotating speed of the electric motor 1 is calculated based on the detection value of the rotational position of the electric motor 1 and the measurement value of the timer. Therefore, both of the error of the rotational position of the electric motor 1 and the error of the timer are corrected. Accordingly, it is possible to accurately calculate the rotating speed of the electric motor 1. As a result, it is possible to prevent deterioration in control performance of the electric motor 1.

INDUSTRIAL APPLICABILITY

As explained above, the electric motor control device according to the present invention can be used in the electric motor system.

REFERENCE SIGNS LIST

1 electric motor
2 position detector
3 time detector
4 speed calculating unit
5 speed correcting unit
6 electric motor control system
7 position correction model
8 speed correction model
9 delay device
100*a* processor
100*b* memory
200 hardware

The invention claimed is:

1. An electric motor control device comprising:
processing circuitry to
    receive a position detection signal from a position detector that detects a rotational position of an electric motor and outputs the position detection signal, the position detection signal including a periodic error determined according to the rotational position,
    receive a position change time signal from a time detector that outputs the position change time signal obtained by detecting a time period in which the position detection signal output from the position detector changes, and
    calculate and output a rotating speed of the electric motor based on the position detection signal and the position change time signal, the processing circuitry being further configured to correct the rotating speed with a speed correction value calculated by a speed correction model for correcting a periodic speed error determined according to the rotational position included in the rotating speed of the electric motor based on the position detection signal, the speed correction model compensating for an error in the position detection signal and a delay in calculating the rotating speed based on the position change time signal.

2. The electric motor control device according to claim 1, wherein the processing circuitry divides a value of the position detection signal changed at a preset calculation period by a value of the position change time signal changed in the preset calculation period to calculate the rotating speed of the electric motor.

3. The electric motor control device according to claim 1, wherein the speed correction model is a model obtained by differentiating a model of the periodic error determined according to the rotational position of the electric motor.

4. The electric motor control device according to claim 1, wherein the speed correction model calculates the speed correction value using the rotational position corrected based on a model of the periodic error determined according to the rotational position of the electric motor based on a value of the position detection signal.

5. The electric motor control device according to claim 1, wherein the position detector is an optical encoder.

6. The electric motor control device according to claim 1, wherein the position detector is a resolver.

7. The electric motor control device according to claim 1, wherein the position detector is a magnetic sensor.

8. The electric motor control device according to claim 1, wherein the time detector detects a time interval from a rising signal edge when the position detection signal changes to a next rising signal edge.

9. An electric motor control device comprising:
processing circuitry to
receive a position detection signal from a position detector that detects a rotational position of an electric motor and outputs the position detection signal, the position detection signal including a periodic error determined according to the rotational position,
receive a position change time signal from a time detector that outputs the position change time signal obtained by detecting a time period in which the position detection signal output from the position detector changes, and
calculate and output a rotating speed of the electric motor based on the position detection signal and the position change time signal, the processing circuitry being further configured to
correct the rotating speed with a speed correction value calculated by a speed correction model for correcting a periodic speed error determined according to the rotational position included in the rotating speed of the electric motor based on the position detection signal,
wherein an amplitude of the speed correction model is determined based on the rotating speed of the electric motor after being corrected by in an immediately preceding calculation period.

10. The electric motor control device according to claim 9, wherein a phase of the speed correction model includes a phase determined based on the rotating speed of the electric motor after being corrected in the immediately preceding calculation period and a half time period of a calculation period.

11. The electric motor control device according to claim 9, wherein the position detector is an optical encoder.

12. The electric motor control device according to claim 9, wherein the position detector is a resolver.

13. The electric motor control device according to claim 9, wherein the position detector is a magnetic sensor.

14. The electric motor control device according to claim 9, wherein the time detector detects a time interval from a rising signal edge when the position detection signal changes to a next rising signal edge.

15. An electric motor control device comprising:
processing circuitry to
receive a position detection signal from a position detector that detects a rotational position of an electric motor and outputs the position detection signal, the position detection signal including a periodic error determined according to the rotational position,
receive a position change time signal from a time detector that outputs the position change time signal obtained by detecting a time period in which the position detection signal output from the position detector changes, and
calculate and output a rotating speed of the electric motor based on the position detection signal and the position change time signal, the processing circuitry being further configured to
correct the rotating speed with a speed correction value calculated by a speed correction model for correcting a periodic speed error determined according to the rotational position included in the rotating speed of the electric motor based on the position detection signal,
wherein amplitude of the speed correction model is directly determined based on a speed command value of the electric motor.

16. The electric motor control device according to claim 15, wherein a phase of the speed correction model includes a phase determined based on the speed command value of the electric motor and a half time period of a calculation period.

17. The electric motor control device according to claim 15, wherein the position detector is an optical encoder.

18. The electric motor control device according to claim 15, wherein the position detector is a resolver.

19. The electric motor control device according to claim 15, wherein the position detector is a magnetic sensor.

20. The electric motor control device according to claim 15, wherein the time detector detects a time interval from a rising signal edge when the position detection signal changes to a next rising signal edge.

* * * * *